United States Patent
Hanada et al.

(10) Patent No.: US 7,950,428 B2
(45) Date of Patent: May 31, 2011

(54) NON-PNEUMATIC TIRE

(75) Inventors: Ryoji Hanada, Hiratsuka (JP); Hideki Seto, Hiratsuka (JP); Yoshiaki Hashimura, Hiratsuka (JP); Jun Matsuda, Hiratsuka (JP); Tsuyoshi Kitazaki, Hiratsuka (JP); Izumi Kuramochi, Hiratsuka (JP); Kenichiro Endo, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 303 days.

(21) Appl. No.: 11/893,295

(22) Filed: Aug. 14, 2007

(65) Prior Publication Data

US 2008/0053586 A1 Mar. 6, 2008

(30) Foreign Application Priority Data

Aug. 29, 2006 (JP) ................................ 2006-231861

(51) Int. Cl.
  *B60C 7/00* (2006.01)
  *B60B 15/20* (2006.01)
(52) U.S. Cl. .......................................... 152/326; 152/7
(58) Field of Classification Search .................. 301/86, 301/13.1; 152/5, 7, 17, 246, 251–252, 300–302, 152/310, 323–329, 40, 69, 80
See application file for complete search history.

(56) References Cited

U.S. PATENT DOCUMENTS

| 963,650 | A | * | 7/1910 | Raymond | 152/301 |
| 1,494,797 | A | | 5/1924 | Nimschke | |
| 1,500,307 | A | * | 7/1924 | Glidden | 152/301 |
| 4,235,270 | A | * | 11/1980 | Kahaner et al. | 152/7 |
| 5,494,090 | A | * | 2/1996 | Kejha | 152/310 |
| 6,615,885 | B1 | * | 9/2003 | Ohm | 152/11 |
| 2004/0070261 | A1 | | 4/2004 | Han | |
| 2004/0159385 | A1 | | 8/2004 | Rhyne et al. | |
| 2006/0027298 | A1 | | 2/2006 | Han | |
| 2006/0144488 | A1 | | 7/2006 | Vannan | |
| 2007/0215259 | A1 | | 9/2007 | Burns | |
| 2008/0314486 | A1 | * | 12/2008 | Manesh et al. | 152/328 |

FOREIGN PATENT DOCUMENTS

EP 0 297 628 A2 1/1989
WO WO 2005/051686 A1 6/2005

* cited by examiner

*Primary Examiner* — Jason R Bellinger
(74) *Attorney, Agent, or Firm* — Greer, Burns & Crain, Ltd.

(57) ABSTRACT

A non-pneumatic tire includes a spoke structure that can be easily mounted on a rim of a wheel. Durability is improved by suppressing the buckling of a spoke structure. A non-pneumatic tire includes a spoke structure (5) and a tread ring (11). The spoke structure (5) includes a cylindrical outer member (2) and a cylindrical inner member (3) which are concentrically arranged, and which are connected to each other with a plurality of fins (4, 4') arranged at intervals in the circumferential direction. The tread ring (11) fits onto the outer periphery of the spoke structure (5). The spoke structure (5) is divided in the tire circumferential direction into at least two circumferential-direction separate structures (511, 521, 531).

7 Claims, 4 Drawing Sheets

NON-PNEUMATIC TIRE

FIELD OF THE INVENTION

The present invention relates to a non-pneumatic tire, and specifically to a non-pneumatic tire which includes a spoke structure, and which can be easily mounted on a rim.

DESCRIPTION OF THE PRIOR ART

Conventionally, non-pneumatic tires including solid tires and cushion tires, each having a solid rubber structure, have been used generally for industrial vehicles. However, since such conventional non-pneumatic tires are heavy, and have poor shock absorbing characteristics, the conventional non-pneumatic tires have not been used for passenger vehicles for which the ride comfort characteristics are important.

A non-pneumatic tire with improved ride comfort characteristics can also be used for passenger vehicles. Patent Document 1 discloses an example of such a tire. In this non-pneumatic tire, an annular tread member is attached to the outer side of a supporting ring structure. The supporting ring structure includes a cylindrical outer member, a cylindrical inner member connected to each other with the plurality of fins placed in between. The plurality of fins are arranged at intervals in the circumferential direction. However, it is difficult to expand and deform, in the radial direction, the supporting ring structure having a three-dimensional structure formed of the cylindrical outer member and the cylindrical inner member as described above. Accordingly, the supporting ring structure is difficult to be mounted on, or removed from, a wheel. For this reason, there are problems that a special machine, such as a torque machine, is required to mount the supporting ring structure on the rim of the wheel, and that the operation of replacing tires is very difficult.

On the other hand, for reducing the weight of such a non-pneumatic tire, it is desirable to reduce the number of fins in the supporting ring structure. However, the reducing of the number of fins makes the interval larger in the circumferential direction between each adjacent two of the fins. Accordingly, the rigidity of a portion of the cylindrical outer member in the middle region between the adjacent two fins is reduced. This results in a problem that a buckling is likely to occur in the portion of the cylindrical outer member in the middle region when the non-pneumatic tire is brought into contact with the ground. The buckling tends to frequently occur especially in the center portion, in the tire width direction, of the cylindrical outer member. This buckling phenomenon has been a cause of a reduction in the durability of non-pneumatic tires.
[Patent Document 1] U.S. Pat. No. 4,235,270

SUMMARY OF THE INVENTION

A main object of the present invention is to provide a non-pneumatic tire which includes a spoke structure, which can be easily mounted on a rim of a wheel.

Another object of the present invention is to provide a non-pneumatic tire whose durability is improved by suppressing the buckling of a spoke structure.

A non-pneumatic tire of the present invention for the purpose of achieving the above-described object includes a spoke structure and a tread ring. The spoke structure includes a cylindrical outer member and a cylindrical inner member which are concentrically arranged, and which are connected to each other with a plurality of fins arranged in between at intervals in the circumferential direction. The tread ring is fitted onto the outer periphery of the spoke structure. In the pneumatic tire, the spoke structure is divided in the tire circumferential direction into at least two circumferential-direction separate structures.

In the non-pneumatic tire of the present invention, the spoke structure is divided in the tire circumferential direction into the circumferential-direction separate structures. Accordingly, when the spoke structure is to be mounted on a rim of a wheel, it is only necessary to mount these circumferential-direction separate structures one by one on the rim. As a result, the mounting of the spoke structure on a rim of a wheel is facilitated.

It is preferable that the number of the circumferential-direction separate structures be 2 to 8.

In addition, it is preferable that the spoke structure be divided in the tire width direction into three width-direction separate structures, and that the fins of one of each adjacent two of the width-direction separate structures are displaced in the circumferential direction relative to the fins of the other one. Moreover, when the fins of adjacent two of the width-direction separate structures have the same arrangement pitch in the circumferential direction, the amount of displacement of the fins between the adjacent two of the width-direction separate structures may be 0.4 to 0.6 times the arrangement pitch. Alternatively, when the fins of adjacent two of the width-direction separate structures have different arrangement pitches from each other in the circumferential direction, the arrangement pitch of the fins of the width-direction separate structure in the center may be made smaller than that of the fins of the width-direction separate structures on both sides.

Moreover, the width of the width-direction separate structure in the center may be smaller than that of each of the width-direction separate structures on both sides. Furthermore, the thickness of each fin of the width-direction separate structure in the center may be smaller than that of each fin of the width-direction separate structure on both sides.

As described above, the spoke structure is further divided in the tire width direction into the three width-direction separate structures while the fins of one of each adjacent two of the width-direction separate structures are displaced in the circumferential direction relative to the fins of the other one. In this case, the fins thus displaced relative to each other operate to enhance the rigidities of the cylindrical outer member between corresponding two of the fins of the adjacent width-direction separate structure. Accordingly, the variation in the rigidity, in the tire circumferential direction, of the cylindrical outer member of the spoke structure is reduced. For this reason, even when the weight of the spoke structure is reduced by reducing the total number of the fins, it is possible to prevent the spoke structure from buckling, and to thus improve the durability.

DESCRIPTION OF THE PREFERRED EMBODIMENTS

Figure 1:
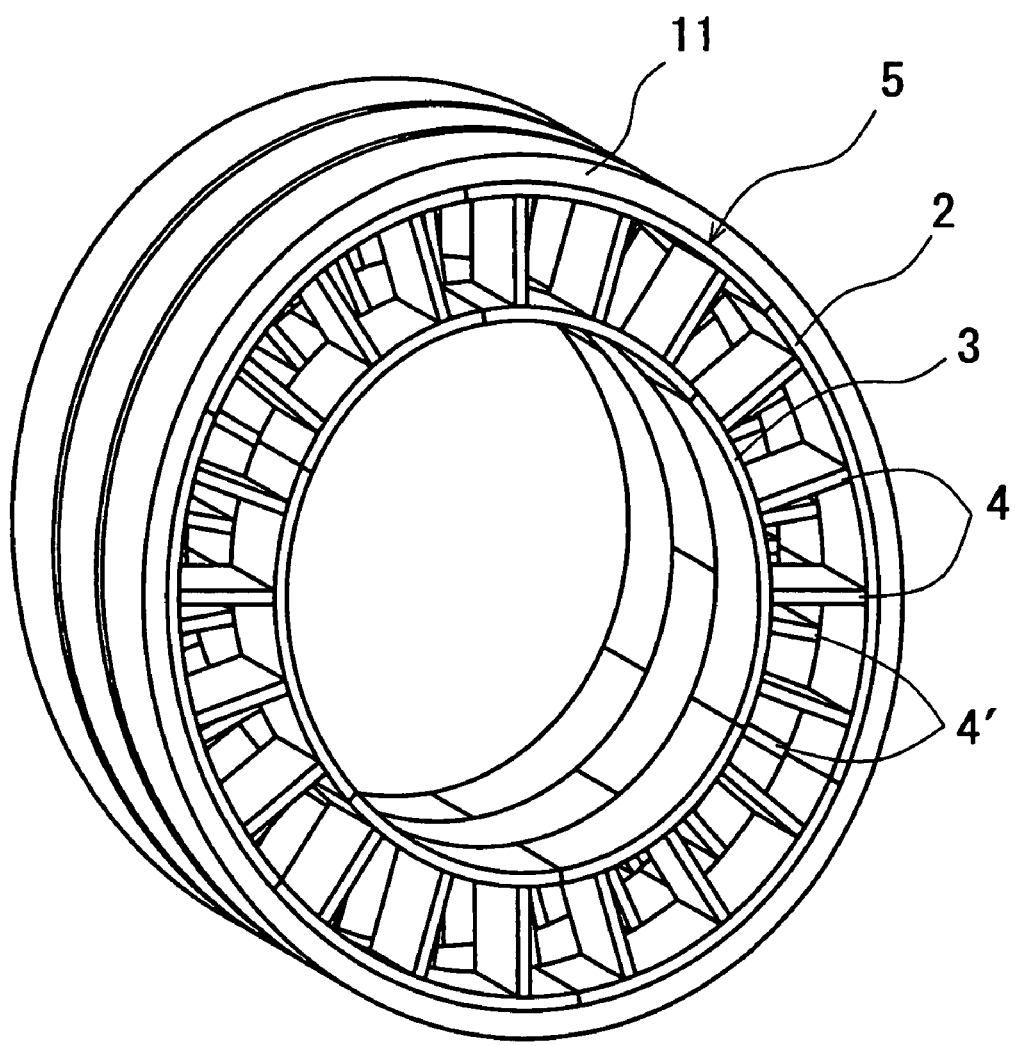
FIG. 1 is a perspective view showing a non-pneumatic tire according to an embodiment of the present invention.

A non-pneumatic tire of the present invention includes a spoke structure 5 and a tread ring 11 that fits onto the outer periphery of the spoke structure 5, as shown in FIG. 1. The spoke structure 5 includes a cylindrical outer member 2, a cylindrical inner member 3 and a plurality of fins 4 and 4'. The cylindrical outer member 2 and the cylindrical inner member 3 are concentrically arranged, and are connected to each other with the plurality of fins 4 or 4' arranged in between at intervals in the tire circumferential direction.

Figure 2:
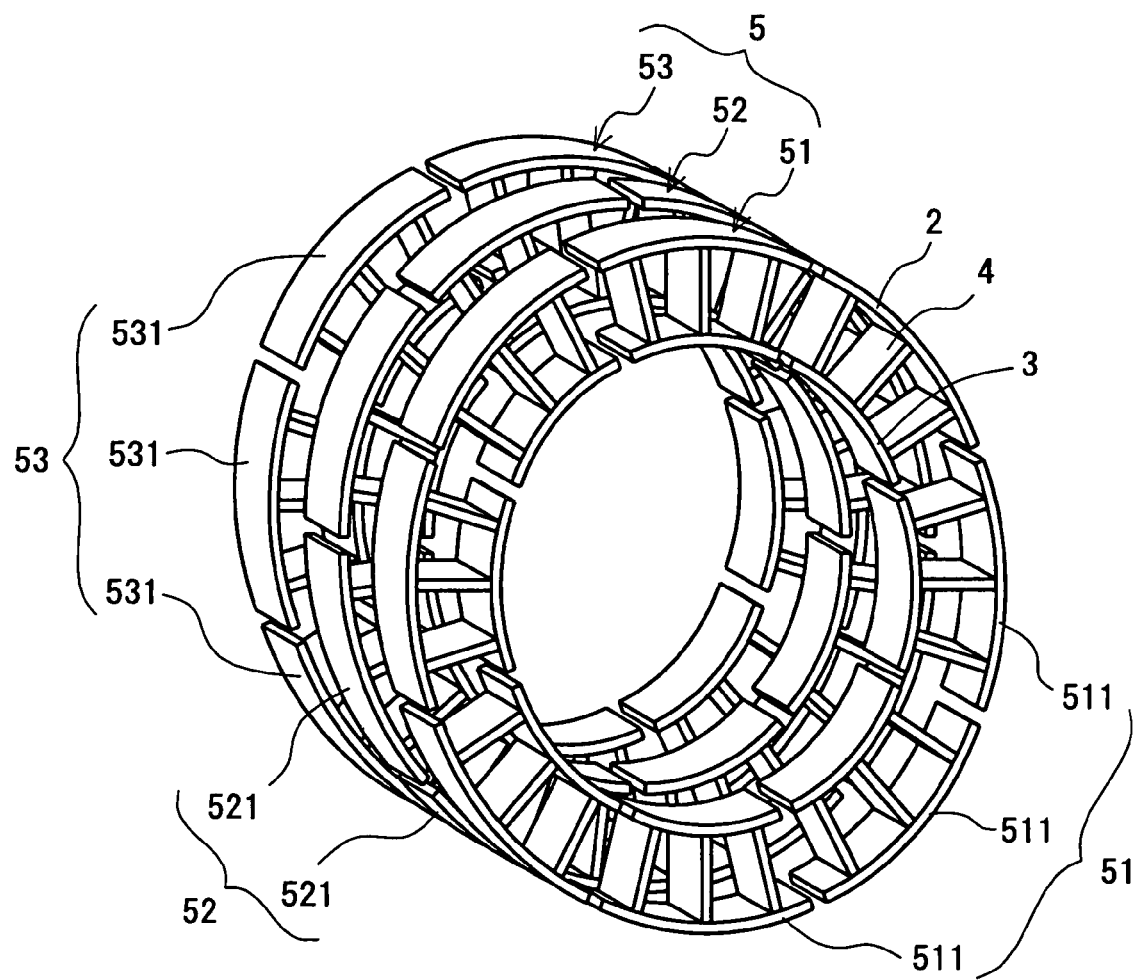
FIG. 2 is an exploded perspective view showing a spoke structure constituting the non-pneumatic tire of FIG. 1 in an exploded state.

As shown in FIG. 2, the spoke structure 5 is divided in the tire width direction into three lines so as to be formed of width-direction separate structures 51, 52 and 53. In addition, each of the width-direction separate structures 51, 52 and 53 is divided in the tire circumferential direction into a plurality of pieces so as to be formed of circumferential-direction separate structures 511, 521 or 531. Since the spoke structure 5 is divided in the tire circumferential direction as described above, the spoke structure 5 may be mounted on a rim of a wheel by mounting the separate structures one by one on the wheel, so that the separate structures are assembled into the spoke structure 5.

The spoke structure 5 is divided at least in the tire circumferential direction into the plurality of separate structures. Accordingly, these separate structures may be mounted one by one on the rim of the wheel so as to be assembled thereon. In addition, as necessarily, these separate structures may be mounted while being bonded to one another with an adhesive agent. Then, after the spoke structure 5 is formed on the rim of the wheel, the tread ring 11 is pressed onto the outer periphery of the spoke structure 5. In this manner, the building of the non-pneumatic tire can be easily completed without using any special torque machine. Since the spoke structure having an integrated structure has a flexibility as compared with the tread ring 11, it is easy to press the tread ring 11 onto the spoke structure 5.

In the embodiment shown in FIG. 2, the spoke structure 5 is divided, in the tire circumferential direction, into 8 pieces. The spoke structure 5 may only be divided into at least two pieces, or preferably be divided into 2 to 8 pieces.

It is more preferable that the non-pneumatic tire of the present invention be configured as exemplified in the embodiment shown in FIG. 2. Specifically, the spoke structure 5 is divided also in the tire width direction into the plurality of width-direction separate structures 51, 52 and 53. At the same time, in each adjacent two of the width-direction separate structures, the fins 4 and the fins 4' are offset in the tire circumferential direction relative to each other. When the fins in each adjacent two of the width-direction separate structures are displaced in the circumferential direction relative to each other, the fins thus displaced enhance the rigidity of the cylindrical outer member 2 in the adjacent width-direction separate structures. Accordingly, it is possible to reduce the variation in the rigidity of the spoke structure in the circumferential direction. In other words, even when the weight of the spoke structure 5 is reduced by increasing the pitch between each adjacent two of the fins arranged in the circumferential direction in the spoke structure 5, it is possible to prevent the cylindrical outer member 2 of the spoke structure 5 from buckling between the fins when the non-pneumatic tire is brought into contact with the ground.

The following two can be given as embodiments in each of which the fins in one of each adjacent two of the width-direction separate structures are displaced in the circumferential direction relative to the fins in the other one. In the first embodiment (1), when the size of a pitch between each adjacent two of the fins is the same in the width-direction separate structures, the fins in one of the adjacent width-direction separate structures are displaced relative to the fins in the other one. In the second embodiment (2), since the size of a pitch between each adjacent two of the fins is different between the adjacent two width-direction separate structures, the fins in one of the width-direction separate structures are necessarily displaced relative to the fins in the other one. Any one of those embodiments may be employed, or those embodiments may be combined to be employed.

Figure 3:
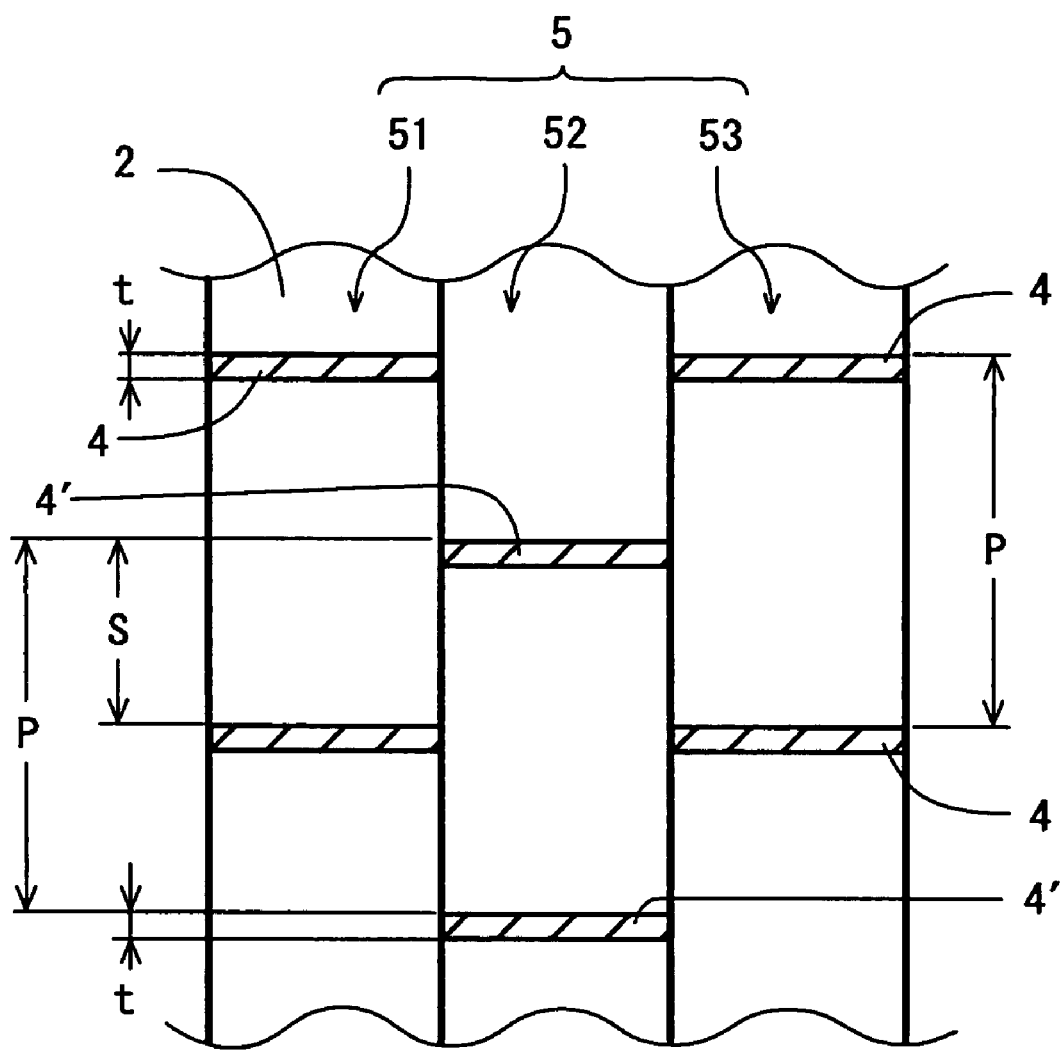
FIG. 3 is an explanatory view showing an example of an arrangement pitch of fins in width-direction-separate structures of the spoke structure constituting the non-pneumatic tire of the present invention.

FIG. 3 shows the first embodiment (1). In the first embodiment (1), the size P of a pitch in the tire circumferential direction between each adjacent two fins 4, 4' is the same in the width-direction separate structures 51, 52 and 53. However, the fins 4' of the width-direction separate structure 52 positioned in the center are displaced in the circumferential direction relative to the fins 4 of each of the width-direction separate structures 51 and 53 on both sides. In this manner, by displacing the phase of the arrangement pitch of the fins 4' of the width-direction separate structure 52 in the center relative to the fins 4 of each of the width-direction separate structures 51 and 53 on both sides, it is possible to enhance the durability of the cylindrical outer member in the center region in the width direction, where the buckling is likely to occur. The amount S of the displacement of the fins relative to each other may be in a range from 0.4 P to 0.6 P, where P denotes the size of a pitch, which is the same in the width-direction separate structures.

Figure 4:
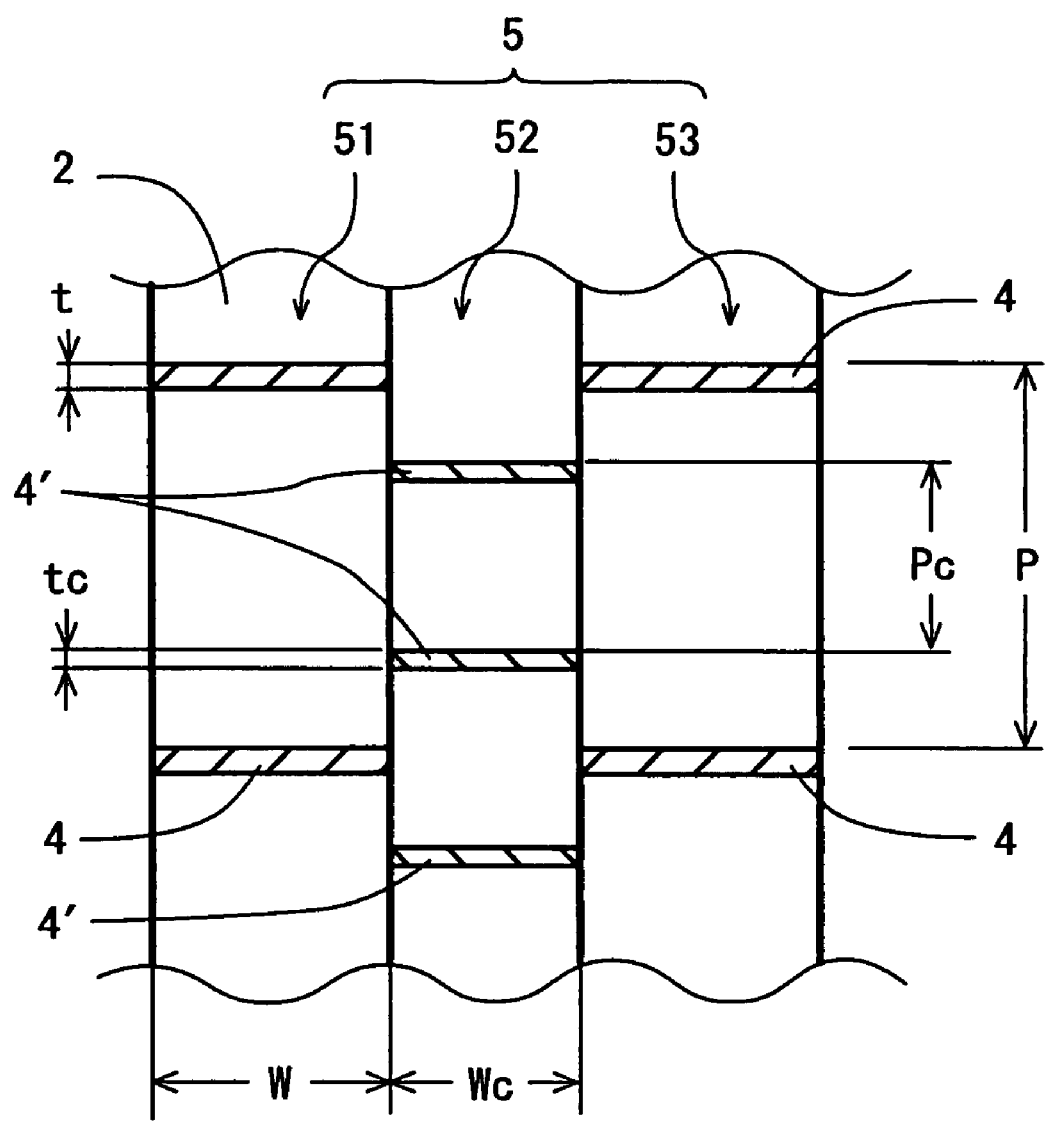
FIG. 4 is an explanatory view showing another example of the arrangement pitch of fins in width-direction-separate structures of the spoke structure constituting the non-pneumatic tire of the present invention.

On the other hand, FIG. 4 shows the second embodiment (2). In the second embodiment (2), each adjacent two of the width-direction separate structures are different in the arrangement pitch of the fins. Among the three lines of the width-direction separate structures, the size Pc of a pitch between each adjacent two fins 4' of the width-direction separate structure 52 in the center is made smaller than the size P of a pitch between each adjacent two fins 4 of each of the width-direction separate structures 51 and 53 on both of the left and right sides. In this manner, the number of fins 4' in the center region in the width direction of the tread, where buckling is particularly likely to occur, is increased.

As a countermeasure against the buckling occurring in the cylindrical outer member of the spoke structure 5, it is preferable that the width Wc, in the tire width direction, of the width-direction separate structure 52 in the center be smaller than the width W of each of the width-direction separate structures 51 and 53 on both sides. By making the width Wc of the width-direction separate structure 52 in the center smaller, it is possible to suppress an increase in the weight of the tire even when the number of fins is increased.

In addition, it is preferable that the thickness tc of each fin 4' of the width-direction separate structure 52 in the center be smaller than the thickness t of each fin 4 of each of the width-direction separate structures 51 and 53 on both sides. By making smaller the thickness tc of each fin 4' of the width-direction separate structure 52 in the center, it is possible to suppress an increase in the weight of the tire, and concurrently to reduce the variation in the rigidity of the cylindrical outer member in the circumferential direction, even when the number of fins 4' is increased.

Moreover, it is possible to easily form suitable spoke structures in accordance with the types of vehicles, applications and the sizes of tires, in the following manner. Specifically, a plurality of kinds of circumferential-direction separate structures each having a different width W of each width-direction separate structure, as well as a different size P of a pitch and a different thickness t of the fin, are prepared in advance. Then, any of the plurality of kinds of circumferential-direction separate structures are appropriately combined to form a spoke structure.

In the present invention, it is preferable that the cylindrical outer member and the cylindrical inner member of the spoke structure be formed of a rubber, a resin, a rubber reinforced with a cord reinforcement material or a resin reinforced with a cord reinforcement material. Among these, the rubber or the resin is more preferable. The constituent material of the cylindrical outer member and the constituent material of the cylindrical inner member may be the same, or may be different. The constituent material of the fins is not particularly limited as long as the constituent material is an elastic material, but may preferably be a rubber or an elastic resin.

What is claimed is:

1. A non-pneumatic tire comprising:
    a spoke structure including a cylindrical outer member and a cylindrical inner member which are concentrically arranged, and which are connected to each other with a plurality of fins arranged in between at intervals in the circumferential direction; and
    a tread ring fitted onto the outer periphery of the spoke structure,
    wherein the spoke structure is divided in the tire circumferential direction into at least two circumferential-direction separate structures;
    wherein the spoke structure is divided in the tire width direction into three width-direction separate structures, which are independent and discrete structures,
    wherein the fins extend across the tire width in the tire width direction and a width of each fin is the same as a width of the width-direction separate structure, such that all of said fins within a single one of said width-direction separate structures are configured and arranged in the same manner; and
    wherein the fins of one of each adjacent two of the width-direction separate structures are displaced in the circumferential direction relative to the fins of the other one.

2. The non-pneumatic tire according to claim 1, wherein the number of the circumferential-direction separate structures is two to eight.

3. The non-pneumatic tire according to claim 1, wherein:
    the fins of each adjacent two of the width-direction separate structures have the same arrangement pitch in the circumferential direction, and
    the amount of displacement of the fins between each adjacent two of the width-direction separate structures is 0.4 to 0.6 times the arrangement pitch.

4. The non-pneumatic tire according to claim 1, wherein among the three width-direction separate structures, the arrangement pitch of the fins of the width-direction separate structure in the center is made smaller than that of the fins of the width-direction separate structures on both sides.

5. The non-pneumatic tire according to claim 1, wherein among the three width-direction separate structures, which each include a plurality of said fins, the width of the width-direction separate structure in the center is smaller than that of each of the width-direction separate structures on both sides.

6. The non-pneumatic tire according to claim 1, wherein among the three width-direction separate structures, which each include a plurality of said fins, the thickness of each fin of the width-direction separate structure in the center is smaller than that of each fin of each of the width-direction separate structures on both sides.

7. The non-pneumatic tire according to claim 5, wherein among the three width-direction separate structures, the thickness of each fin of the width-direction separate structure in the center is smaller than that of each fin of each of the width-direction separate structures on both sides.

* * * * *